(12) United States Patent
Long et al.

(10) Patent No.: US 6,281,892 B1
(45) Date of Patent: Aug. 28, 2001

(54) SYSTEM AND METHOD OF TABLE-DRIVEN COMPUTER INTERFACE

(75) Inventors: William L. Long, Dallas; Richard G. Van Tyne, Jr., Denton; Scott J. Haney, Collin; Dwight C. Hilton, Denton; Michael W. Duncan, Dallas; Vasundhara K. Reddy, Collin, all of TX (US)

(73) Assignee: Alcatel USA Sourcing, L.P., Plano, TX (US)

( * ) Notice: Subject to any disclaimer, the term of this patent is extended or adjusted under 35 U.S.C. 154(b) by 0 days.

(21) Appl. No.: 09/212,849

(22) Filed: Dec. 16, 1998

(51) Int. Cl.[7] .................................................. G06F 3/14
(52) U.S. Cl. ............................ 345/329; 345/336; 345/338; 345/339; 707/503; 707/505; 709/203; 709/318; 709/331
(58) Field of Search ................................ 345/338, 336, 345/326, 339, 329; 709/318, 328, 203, 331; 707/503, 505, 509; 717/1, 2, 4

(56) References Cited

U.S. PATENT DOCUMENTS

| | | | |
|---|---|---|---|
| 5,596,752 | * | 1/1997 | Knudsen et al. ................. 395/701 |
| 5,689,698 | * | 11/1997 | Jones et al. ........................ 707/4 |
| 5,708,828 | * | 1/1998 | Coleman .......................... 707/523 |
| 5,752,246 | * | 5/1998 | Rogers et al. ..................... 707/10 |
| 5,802,493 | * | 9/1998 | Sheflott et al. ..................... 705/1 |
| 5,966,707 | * | 10/1999 | Van Huben et al. .............. 707/10 |
| 5,983,228 | * | 11/1999 | Kobayashi et al. ................ 707/10 |

\* cited by examiner

*Primary Examiner*—Raymond J. Bayerl
*Assistant Examiner*—Thomas T. Nguyen
(74) *Attorney, Agent, or Firm*—Baker Botts L.L.P.

(57) ABSTRACT

A table-driven interface system and method to a computer application is provided. The system includes an input handler operable to receive a command entered by a user, and at least one input table indexable by the received command for determining a sequence of required input parameters associated with the received command, the sequence of required input parameters being used to prompt the user for required input parameter values. A server handler is operable to construct a message having a predetermined format containing the required input parameter values, the server handler further operable to send the constructed message to a server. The server handler is operable to receive a reply message from the server containing at least one output parameter value. At least one output table containing display control information are indexable by the received command and required input parameters. An output handler is operable to construct a formatted display of the at least one output parameter value with the display control information contained in the at least one output table, the formatted display being displayed to the user. New commands and parameters can be added by updating the tables and not the handlers.

33 Claims, 5 Drawing Sheets

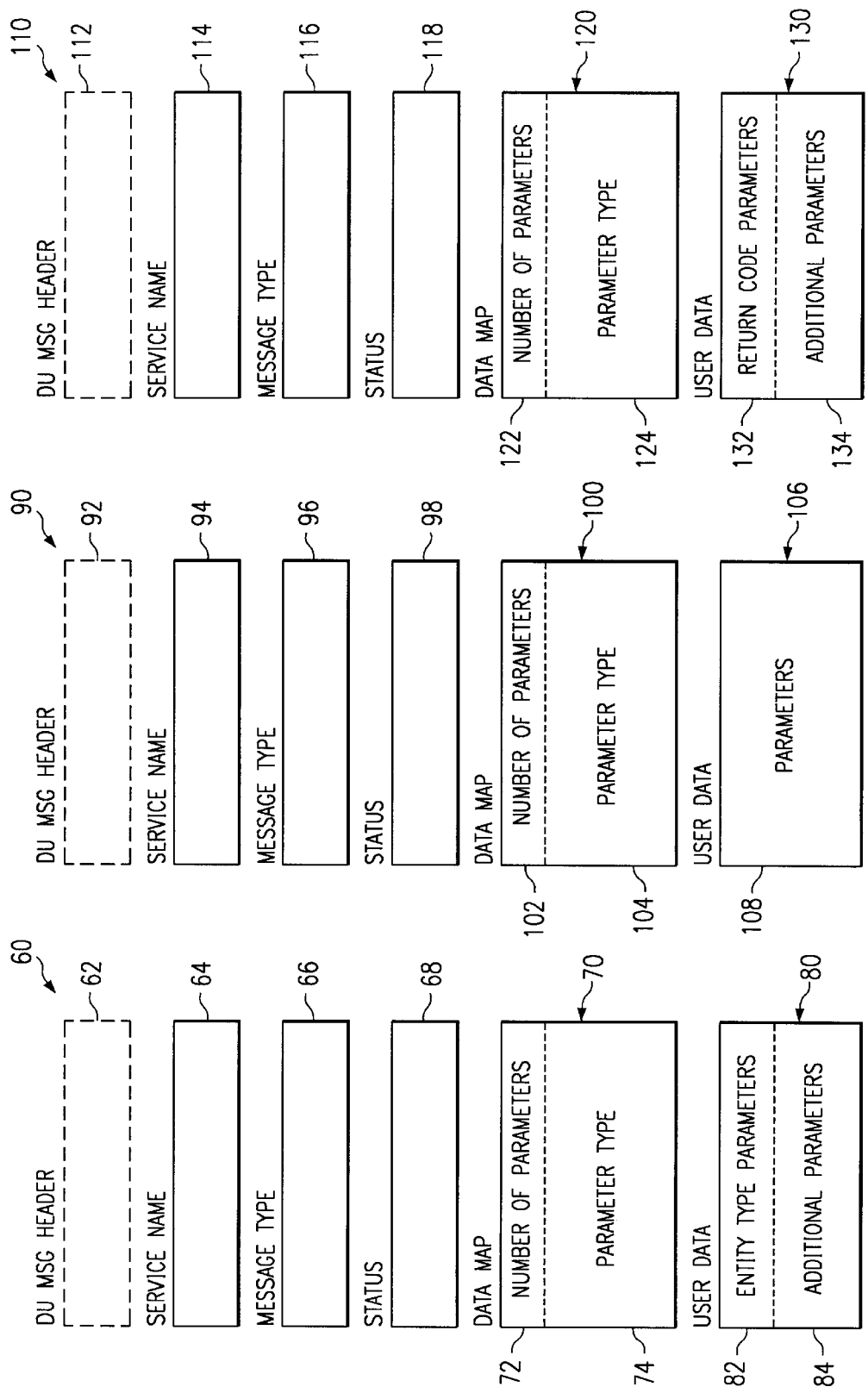

SERVICE NAME
MESSAGE TYPE
STATUS
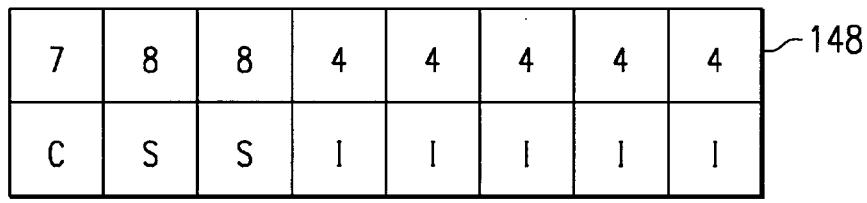
DATA MAP
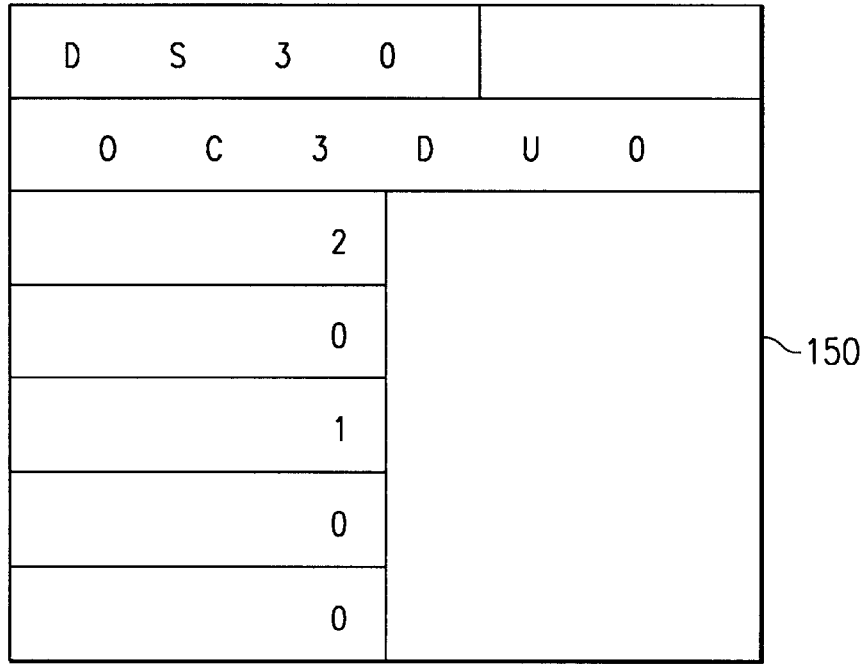
FIG. 6

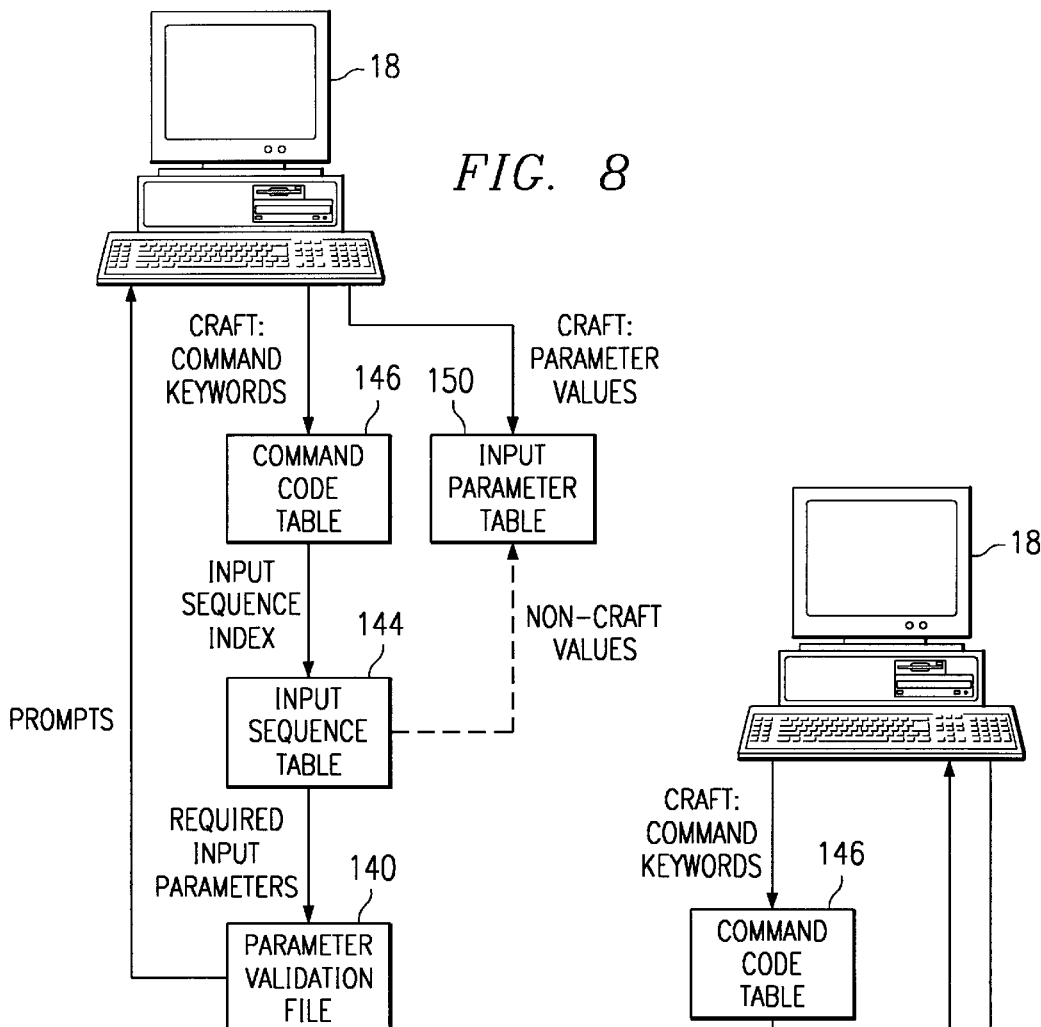

SYSTEM AND METHOD OF TABLE-DRIVEN COMPUTER INTERFACE

TECHNICAL FIELD OF THE INVENTION

This invention is related in general to the field of computer systems. More particularly, the invention is related to a system and method of table-driven computer interface.

BACKGROUND OF THE INVENTION

Great advances have been made in the field of computers and other computer processor-based systems. The computers are able to process data at speeds previously unimaginable. However, one bottleneck remains—the interface between humans and the computer. Humans must enter data or commands in a form that the computer understands and can process.

For many telecommunications equipment, the interface between craft personnel and the equipment is often via command-line entries of keyword-based commands. Typically, the entry of a particular command would trigger the execution of a subroutine or program that would then perform the task indicated by the entered command. Therefore, each command would have its own corresponding program that carries out the command. Whenever there is a change, addition or deletion to any of the commands and/or associated parameters, large chunks of software code has to be modified, added or deleted. The interface program then has to be recompiled, linked, and tested. Therefore, any change to the requirements of the commands and parameters and interface formats would require time-consuming and tedious recoding or coding of the software.

SUMMARY OF THE INVENTION

Accordingly, there is a need for a system and method of interfacing with the computer or telecommunications equipment to reduce the time, cost and effort of maintaining and implementing changes to the commands and associated parameters.

In one aspect of the invention, a table-driven interface system to a computer application is provided. The system includes an input handler operable to receive a command entered by a user, and at least one input table indexable by the received command for determining a sequence of required input parameters associated with the received command, and the sequence of required input parameters being used to prompt the user for required input parameter values. A server handler is operable to construct a message having a predetermined format containing the required input parameter values, the server handler further operable to send the constructed message to a server. The server handler is operable to receive a reply message from the server containing at least one output parameter value. At least one output table containing display control information are indexable by the received command and required input parameters. An output handler is operable to construct a formatted display of the at least one output parameter value with the display control information contained in the at least one output table, the formatted display being displayed to the user.

In yet another aspect of the invention, a table-driven method to interface to a computer application provides for receiving a command entered by a user, indexing into at least one input table by the received command and determining at least one required input parameter associated with the received command, prompting the user to enter a value for the at least one required input parameter, putting the user-entered at least one required input parameter value in an input parameter table, constructing a message having a predetermined format containing the at least one required input parameter value contained in the input parameter table, and sending the constructed message to a destination.

A technical advantage of the present invention provides an easy and quick way to implement changes to the table-driven interface system. Any changes or additions to the command keywords, required parameters for the commands, formats, etc. would require only that appropriate changes be made in the tables. No additional coding, code modification and debugging is necessary. A change or addition to a server would only require changes to the table-driven interface system tables associated with the changed server without having to modify the table-driven interface system code.

BRIEF DESCRIPTION OF THE DRAWINGS

For a better understanding of the present invention, reference may be made to the accompanying drawings, in which:

FIG. 3 is an exemplary input message format according to the teachings of the present invention;

FIG. 4 is another exemplary input message format according to the teachings of the present invention;

FIG. 5 is an exemplary reply message format according to the teachings of the present invention;

FIG. 6 is a message example according to the teachings of the present invention;

FIG. 8 is a block diagram showing the data used to index into the input tables and the data obtained from the tables as a result; and FIG. 9 is a block diagram showing the data used to index into the input tables and the entity type data obtained from the tables as a result.

DETAILED DESCRIPTION OF THE INVENTION

Figure 1:
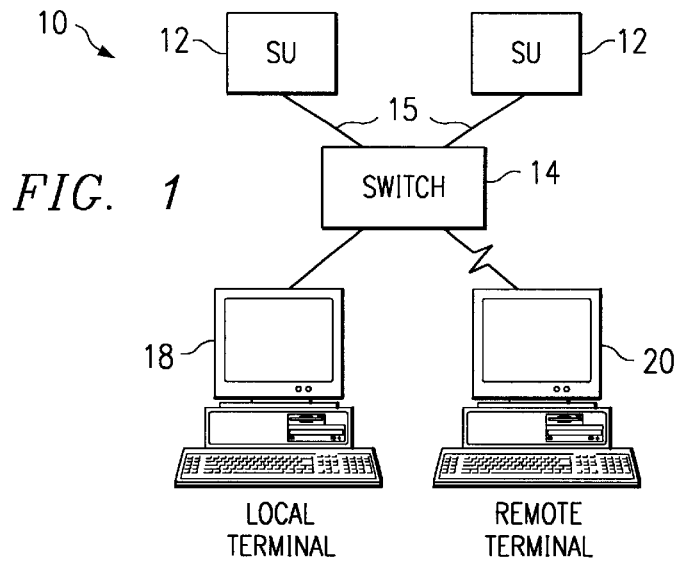
FIG. 1 is a top-level block diagram of a distributed switching system employing the system and method of computer interface according to the teachings of the present invention.

The preferred embodiments of the present invention are illustrated in FIGS. 1–9, like reference numerals being used to refer to like and corresponding parts of the various drawings.

Referring to FIG. 1, a block diagram of an embodiment of a distributed telecommunications switching system 10 is shown. Distributed telecommunications switching system 10 is an exemplary operating environment for the system and method of computer interface of the present invention and is described briefly herein. Distributed telecommunications switching system 10 includes one or more service unit subsystems 12 that provide control and management. Distributed telecommunications switching system 10 also includes at least one switch 14 that provides the message transport and switching mechanism for call information.

Service unit subsystem 12 and switch 14 may communicate with one another through a communications media 15, which may be optical fiber, copper, air, etc.

Switch 14 provides the control and management functions for distributed telecommunications switching system 10 and is separated from service unit subsystem 12. This separation of functionality allows service unit subsystem 12 and switch 14 to independently evolve and be upgraded to support new services or new technologies for unique enhancements to service unit subsystem 12 or switch 14. Service unit subsystem 12 and switch 14 of distributed telecommunications switching system 10 may be geographically grouped within a single area or geographically disbursed in several remote areas while maintaining the distributed nature of the switching function performed.

Craft personnel may interface with switch 14 via terminals 18 co-located with switch 14 or terminals 20 located remotely from switch 14. Remote terminal 20 may communicate with switch 14 via ethernet, dial-in, radio signals, or any suitable medium.

Craft personnel may enter keyword-based commands via local or remote terminals, 18 and 20 respectively, to obtain the status and change the status of various units, devices, and facilities within distributed telecommunications switching system 10. A system and method of table-driven computer interface of the present invention is employed to enable this communications path between craft personnel and distributed telecommunications switching system 10.

Figure 2:
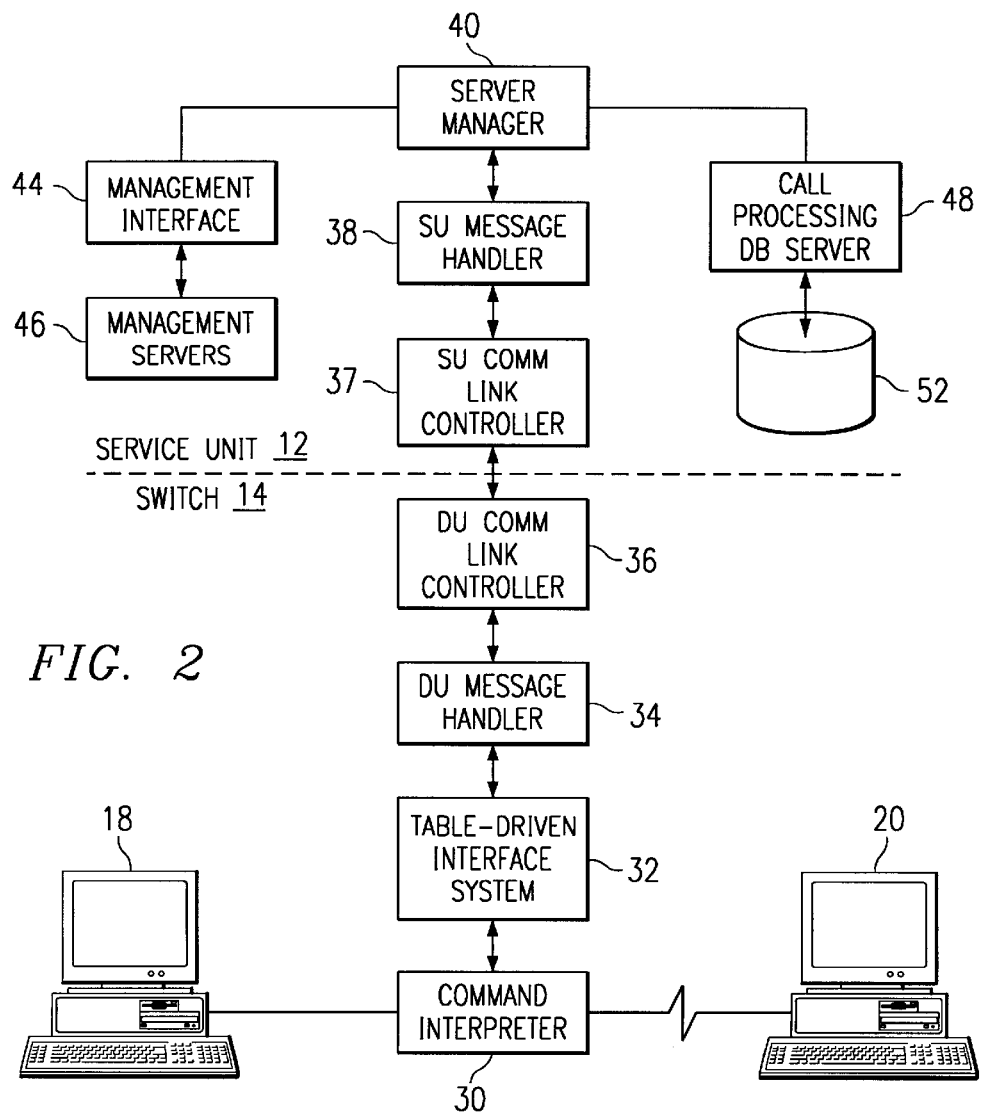
FIG. 2 is a context block diagram of the distributed switching system employing the system and method of computer interface according to the teachings of the present invention.

FIG. 2 is a context block diagram for system and method of table-driven computer interface according to an embodiment of the present invention. Each block in FIG. 2 may represent a software or hardware module. Referring to FIG. 2, a craft personnel enters a command at local terminal 18 or remote terminal 20. The command typically contains two parts: a keyword. sequence and one or more predefined parameters. The command may be entered on a command-line, selected from a menu, or by any other suitable manner. A command interpreter 30 receives the command from the terminals and starts table-driven interface system 32. Command interpreter 30 provides the craft interface for interface module including prompting for input parameters and providing display output. Table-driven interface system 32 also controls craft prompting. Command interpreter 30 then hands table-driven interface system 32 the received command. Table-driven interface system 32 receives the command and constructs a message having a predetermined format and puts the command and its parameters in predetermined fields in the message. The formats of the messages are described below by referring to FIGS. 3–5. Table-driven interface system 32 then sends the message to a DU (delivery unit) message handler 34. Switch and delivery unit in this document are used interchangeably.

DU Message handler 34 forwards the messages to a DU communications link controller 36 and an SU (service unit) communications controller 37, which control a communications link coupled between switch 14 and service unit subsystem 12. Although not apparent in FIG. 2, DU message handler 34 may function like a message traffic director, which receives messages from various sources and forwards them to the destination according to routing information specified in the messages. The destination may include service unit subsystem 12, as here, or other service units. On the side of service unit subsystem 12, an SU communications link controller 37 is coupled to the link between switch 14 and service unit subsystem 12 and sends the received messages to an SU message handler 38. SU message handler 38 routes the received messages to registered applications on board service unit subsystem 12. Server manager 40 is such a registered application. The primary function of server manager 40 is to provide an interface for applications running on service unit subsystem 12 to communicate with remote clients, including table-driven interface system 32. Server manager 40 routes the messages to a number of destinations, including a management interface 44 or a call processing database server 48 that may perform tasks related to or in response to commands entered on terminals 18 and 20. Management interface 44 then routes the messages to the appropriate management servers 46. Those management servers 46 that interface with table-driven interface system 32 may include a configuration management server (not shown) and a test management server (not shown). The messages may be routed by server manager 40 to call processing database server 48, which provides access to call processing database 52. The destination server of the messages processes the command and parameters in the messages and formulates response messages.

Response messages may be constructed by management servers 46 or call processing database server 48 and sent back to table-driven interface system 32 along the same path but in the opposite direction.

Message Formats

FIGS. 3–5 are block diagrams showing exemplary formats of an input message 60 with entity type parameters, an input message 90 without the entity type parameters and a reply message 110, respectively. An entity may be any identifiable object including a device, a facility, an application, a software object, a group of software objects, a server, a client, a circuit, a subsystem, a circuit card, and the like. In the present invention an entity is identified as a device, facility, or unit. Entity is viewed as a high level identifier. An entity may be identified by an entity type which is a specific type of entity. For example, an STGS is an entity type of a device entity. A specific entity may be identified by an entity identifier (EID). The term "entity" refers to the general type of entity, such as device, facility, and unit, and the term "entity type" refers to the specific type of entity, such as STGS, BCM, DSO, etc, and the term "entity identifier" or EID refers to a specific entity. FIG. 6 further shows an example of a message with some of the data fields filled in with exemplary values. The description below regarding the message formats are applicable to FIGS. 3–6.

The message formats 60, 90, and 110 include a message header field (62, 92, 112), a service name field (64, 94, 114), a message type field (66, 96, 116), a status field (68, 98, 118), a data map field (70, 100, 120), and a user data field (80, 106, 130).

The message field length may be fixed or variable. The message header field contains a message header required for all messages passed between service unit subsystem 12 and switch 14. The message header field contains information to route the message to the server manager. Service name field 64 contains information for routing the message to the appropriate server destination. The service name field contains command and entity identifier information. The entity identifier may be a character string used to identify an entity in the system.

It may be seen in FIG. 6, that service name may be a character string. Specific requirements concerning special characters may be predetermined to enable parsing of the character string on the receiving end.

The message type field of the message format contains a value that indicates whether the message is a data or control message. The status field contains a value that indicates whether the message communication is synchronous or asynchronous. The data map field is a directory that provides information on how the user data parameters should be parsed. The data map identifies the user data parameter type(s) and may contain an integer parameter count followed by an integer representing the type of each parameter. For certain input message requests, an entity type with its seven parameters are the first seven parameters. In the example shown in FIG. 6, the "7" is the number of parameters in the user data field, followed by the same number of integers representing the data type of each parameter. Therefore in the example, the 7 count (C) is followed by seven integers, where an "8" is used to represent a string format and a "4" is used to represent an integer format. The data map is followed by the user data field, which contains the actual parameters. In message formats with entity type, the entity type parameter values are the first seven parameters in the user data field.

In the reply message format shown in FIG. 5, the status field may contain two status values. One predetermined value is used to indicate that the request the reply is responding to was successfully carried out and that the user data contains a valid response. A second predetermined status value is used to indicate that the request or response failed and that further processing of the user data should be terminated. In the user data field, a return code of three parameters is provided. The return code may indicate success or failure, a reason for the failure if applicable, and a result character string that describes the error condition or success result. The result character string may be displayed to the craft at the local or remote terminal. The remainder of the user data field may contain output parameters as a result of executing the command.

Input Handler

Figure 7:
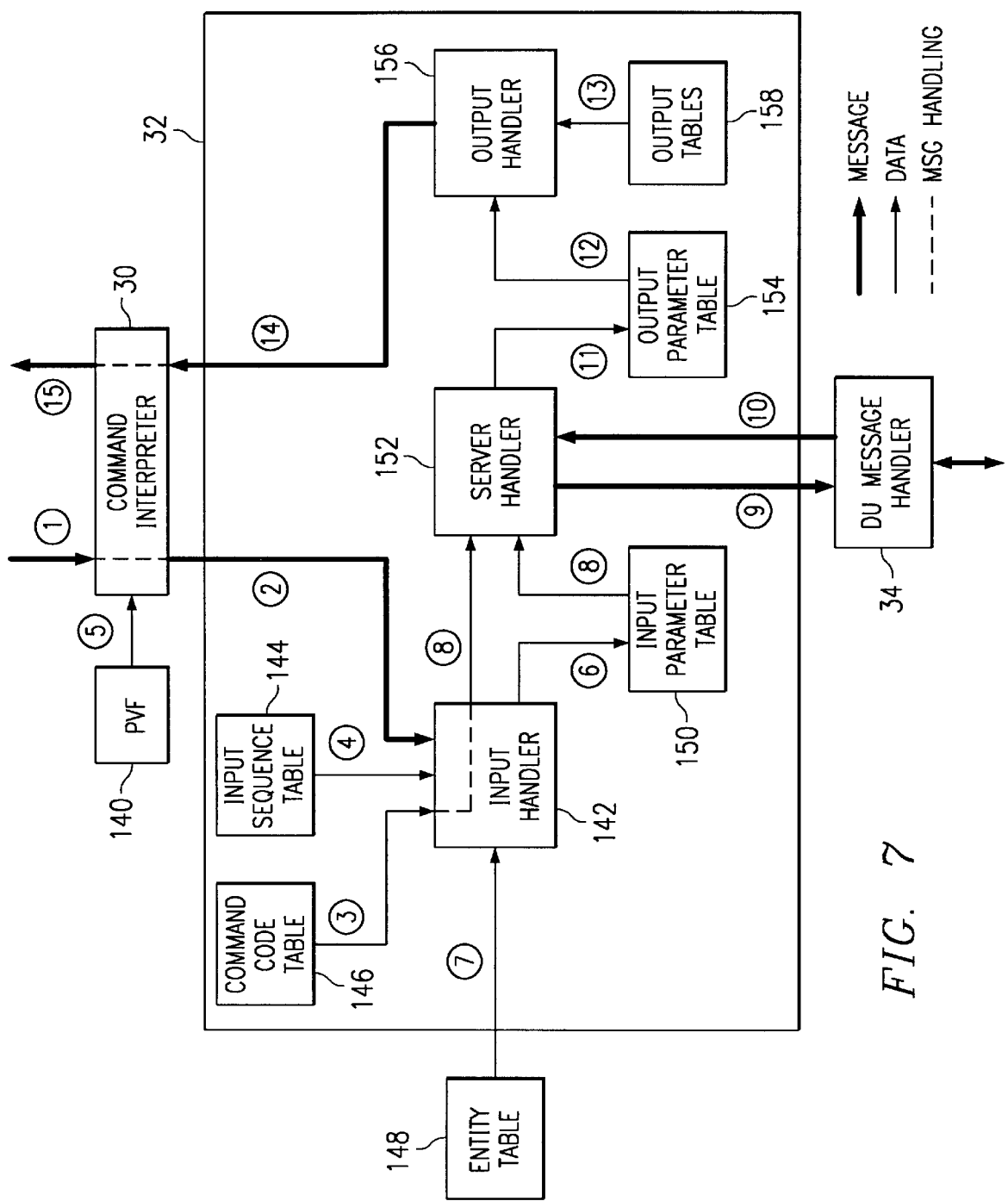
FIG. 7 is a block diagram of the architecture and process of the computer interface according to the teachings of the present invention.

Referring to FIG. 7, a block diagram of table-driven interface system 32 and data flow steps therein is shown. In FIGS. 8 and 9, the process is shown in the context of what data is used to access a table and what data is obtained from a table. The description below may refer to FIGS. 7–9 simultaneously.

A craft-entered command containing one or more keywords is first received by command interpreter 30 from local or remote terminals 18 or 20, respectively (FIG. 7 step 1). Command code table, shown in TABLE A, lists examples of commands in the first column and corresponding input sequence table indices in the second column.

TABLE A (Command Code Table)

| Command Code | Input Sequence Table Index | Service Name Prefix | Ranges |
|---|---|---|---|
| DISPLAY SBB UNIT | 3 | Cm Get Unit, | Y |
| DISPLAY SSB DEVICE | 1 | Cm Get Device, | Y |
| DISPLAY SBB FACILITY | 2 | Cm Get Tp, | Y |
| REMOVE SBB DEVICE | 4 | Cm Remove Device, | Y |
| RESTORE SBB DEVICE | 5 | Cm Restore Device, | Y |

TABLE A-continued (Command Code Table)

| Command Code | Input Sequence Table Index | Service Name Prefix | Ranges |
|---|---|---|---|
| REMOVE SBB FACILITY | 6 | CM Remove Tp, | Y |
| RESTORE SBB FACILITY | 7 | Cm Restore Tp, | Y |
| STATUS SBB UNIT | 3 | Cm Status Unit, | N |
| TEST SBB DEVICE | 8 | Tm Test Device, | Y |

Therefore, the craft-entered command is used as an index into command code table to obtain an input sequence table index. For example, if the command text string "RESTORE SBB FACILITY" is entered at the terminal, the command is passed through command interpreter 30 to input handler 142 (step 2). Input handler 142 uses a number of input tables to obtain the proper parameters for the craft-issued command. The input tables include a command code table 146, an input sequence table 144, and a entity table 148. Input handler looks up in command code table 146 an input sequence index of 7 into input sequence table (step 3). Input sequence table 144 contains a list of the required input parameters for the commands. An exemplary input sequence table 144 is shown below:

TABLE B (Input Sequence Table)

| Index | Field 1 | Field 2 | Field 3 | Field 4 | Field 5 |
|---|---|---|---|---|---|
| 1 | DEV | End Flag | | | |
| 2 | FAC | End Flag | | | |
| 3 | UNIT | End Flag | | | |
| 4 | DEV | Mode | Remove Type | Maint Type | End Flag |
| 5 | DEV | Mode | Restore Type | Maint Type | End Flag |
| 6 | FAC | Mode | Remove Type | Maint Type | End Flag |
| 7 | FAC | Mode | Restore Type | Maint Type | End Flag |
| 8 | TEST | Origin Id | Test Type | Operation Type | End Flag |

Accordingly, using index 7 into input sequence table yields the required four parameters for the command "RESTORE SBB FACILITY": FAC (facility entity), mode, restore type, and maintenance type (step 4). Parameters, such as Restore type and Maintenance type are not entity type parameters. The process for processing non-entity type parameters is shown in FIG. 8, which is described below. Note that FAC (facility) is an entity parameter which includes seven parameters. The process for obtaining the entity parameters are shown specifically in FIG. 9, which is described below.

Non-entity Parameter Processing

As described above, field 3 of the index 7 entry in input sequence table 144 is the restore type parameter. The restore type parameter is a non-entity parameter, the processing of which is shown in FIG. 8. Command interpreter 30 is instructed by input handler 142 to display a prompt for restore type according to the input sequence table. Using a parameter validation file (PVF) 140, command interpreter 30 displays the appropriate prompt for restore type, which is "Restore Type" (step 5). Parameter validation file 140 is shown as TABLE C below. Note that some parameters in input sequence table 144 may not require a craft prompt. As the craft personnel enters the value for restore type in response to the prompt, the parameter value is passed on from command interpreter 30 to input handler 142 and is used to fill in an input parameter table 150 (step 6). The filled contents of input parameter table 150 will be used to construct the message. Input parameter table 150 contains a list of all the possible parameters for all messages that pass between table-driven interface system 32 and server manager 40.

The processing of non-entity parameters then follows essentially the same steps as entity parameters, which is described below in reference to FIG. 9.

TABLE C

Parameter Validation File

Unit Type
Device Type
Facility Type
Unit ID
Side
Device Entity Number
Facility Entity Number — STS1
Timing Group
VT Group
VT 1.5 Subgroup (Channel)
DS1
Remove Type
Restore Type Entity Parameter Processing In a response to the craft's entry of "RESTORE SBB FACILITY", command interpreter 30 is instructed by input handler 142 to display a prompt for each of the required parameters indicated in input sequence table 144. Using parameter validation file 140, command interpreter 30 displays the appropriate prompts according to the required parameter (step 5). Note that different commands may require the same set of parameters and therefore the same prompts for craft entry. TABLE C above provides exemplary prompts in the parameter validation file.

As the craft personnel enters the value for each parameter in response to each prompt, the parameter value is passed on from command interpreter 30 to input handler 142 and is used to fill in an input parameter table 150 (step 6). The filled contents of input parameter table 150 will be used to construct the message. Input parameter table 150 contains a list of all the possible parameters for all messages that pass between table-driven interface system 32 and server manager 40. Some parameters (entity parameters), such as the device entity and facility entity, require multiple craft prompts and responses which are used to fill in multiple input parameter table values; other parameters (non-entity parameters), such as restore type, require only a single craft prompt and response; yet some other parameters(non-prompt parameters), such as maintenance type, merely require a field in the input parameter table to be set and do not cause a craft prompt, shown as non-craft parameter values in FIG. 8. An exemplary input parameter table is shown as Table D:

TABLE D

Input Parameter Table

| Parameter Name Index | Included | Value |
|---|---|---|
| (EID) EID Type Index | Y/N | integer |
| (EID) Unit Type ID | Y/N | integer |
| (EID) Unit ID | Y/N | integer |
| (EID) Side | Y/N | integer |
| (EID) Entity Number | Y/N | integer |
| (EID) Group Number 1 | Y/N | integer |
| (EID) Group Number 2 | Y/N | integer |
| Remove/Restore Mode | Y/N | integer |
| Remove Type | Y/N | integer |
| Restore Type | Y/N | integer |
| Maintenance Type | Y/N | integer |
| Shelf | Y/N | integer |
| Clock Source | Y/N | integer |
| Lock | Y/N | integer |
| Test Origin ID | Y/N | integer |
| Test Type | Y/N | integer |
| Test Operation Type | Y/N | integer |

Input parameter table 150 is accessed via the parameter name index. Each parameter value entered by the craft personnel is mapped into one or more parameter fields in input parameter table 150. The second column, the included field, is set or cleared to indicate whether the corresponding parameter is to be included in the message. The third column, the value field, is the field filled in with parameter values. The first seven parameters are entity type parameters.

Referring to FIG. 9, the process of entity type parameter handling is shown. As before, the input sequence index from command code table 146 is used as an index into input sequence table 144 to determine the input parameters required for the specified command. Field 1 of input sequence table 144 identifies what entity is required, i.e., device, facility, or unit. Using this information, entity table (TABLE E) is scanned to obtain a list of entity types that are of the specified entity. Entity table 148 may be stored in a memory device or on a portable storage medium. An example of entity table 148 is shown below as TABLE E.

For example, if the command "DISPLAY SBB FACILITY" is the craft entry, it leads to index 7 in input sequence table 144, which specifies a facility entity. Scanning entity table 148 (TABLE E column 2, i.e. Entity column for an entry of the letter F) yields the following entity types: DS1, DS3, EXTSYN, OC3, STS1, and VT1. Note that the entity names given in entity table are exemplary and the invention is not limited to the specific data in the tables or the specific format of the tables and messages described herein.

TABLE E (Entity Table)

| Entity Type ASCII Name | Entity | Min | Max | Paired | Unit Type ID | Unit Type Name |
|---|---|---|---|---|---|---|
| BCM | D | 0 | 1 | Y | 1 | OC3DU |
| CDS | D | NA | | Y | 1 | OC3DU |
| DS0 | F | 0 | 119039 | N | 1 | OC3DU |
| DS1 | F | 0 | 4959 | N | 1 | OC3DU |
| DS3 | F | 1 | 3 | N | 1 | OC3DU |
| ECHO | D | 0 | 7 | N | 1 | OC3DU |
| EXTSYN | F | NA | | Y | 2 | OC3ADMIN |
| HLTP | D | NA | | Y | 1 | OC3DU |
| MTXI | D | NA | | Y | 1 | OC3DU |

TABLE E-continued (Entity Table)

| Entity Type ASCII Name | Entity | Min | Max | Paired | Unit Type ID | Unit Type Name |
|---|---|---|---|---|---|---|
| OC3 | F | NA | | N | 1 | OC3DU |
| OTM | D | NA | | Y | 1 | OC3DU |
| SCAN | D | NA | | Y | 1 | OC3DU |
| STGS | D | NA | | Y | 2 | CC3ADMIN |
| STS1 | F | 1 | 3 | N | 1 | OC3DU |
| STSM | D | 0 | 2 | Y | 1 | OC3DU |
| UNIT | U | NA | | N | 1 | OC3DU |
| VT1 | F | NA | | N | 1 | OC3DU |

The entity column refers to device type (D), facility type (F) and unit type (U). The ASCII names or character strings for the entity types satisfying the specified entity are then displayed to the craft using an appropriate prompt from parameter validation file listing all relevant entity types from the entity table. The craft responds by selecting or typing in a value indicative of the entity type. This value is then used as an index (entity type index) into entity table to access the particular entity type. From entity table, all entity type parameter values are obtained and put into input parameter table 150.

For example, if the craft selection for facility entity is DS3 entity type, the parameter values for DS3 entity type is identified in entity table 148. In TABLE E, DS3 occupies the fifth row:

Fifth Row of TABLE E (Entity Table)

| EID Type ASCII Name | Entity Type | Min | Max | Paired | Unit Type ID | Unit Type Name |
|---|---|---|---|---|---|---|
| DS3 | F | 1 | 3 | N | 1 | OC3DU |

Therefore the first seven entity type parameters in input parameter table can be filled out with values from this row. The entity type index is the index used to select the particular row in entity table 148. The unit type ID is obtained directly from the entity table. The unit ID is determined by the unit type name value given in entity table 148. Depending on the unit type, predetermined unit type ID may be assigned or a value therefor may be prompted.

For example, if the unit type is OC3ADMIN, then the unit ID value in input parameter table 150 is set to a predetermined value. If the unit type is OC3DU, then the craft may be prompted for a unit ID. The next parameter in input parameter table 150 is side, which is determined by the paired field in entity table 148. If the paired field indicates that the entity type is paired, then the craft is prompted to specify either side A or B. If the entity type is not paired, the side field is set to zero in input parameter table 150. The next parameter, entity number, is determined by values in the minimum and maximum fields in entity table 148. If the minimum value indicates non-applicable (NA), then the entity number field in input parameter table 150 is set to zero. Otherwise, the craft is prompted for an entity number using the range specified by the minimum and maximum values. The number returned by the craft is then entered into input parameter table 150. Group numbers 1 and 2 fields in input parameter table 150 are also determined by the entity type. Depending on the entity type, specific prompts in parameter validation file 140 are used to prompt the craft. The values entered by the craft are entered in the appropriate fields in input parameter table 150.

Server Handler

Referring back to FIG. 7, when all of the required parameter fields in input parameter table 150 are filled in, server handler 152 uses the values in input parameter table 150 to build a message (step 8). Server handler 152 uses input parameter table entries whose included field is set to "Y". Server handler 152 also directly receives command code table data from input handler 142, such as the service name prefix string. A service name string is then created by appending the entity type string to the service name prefix string. The service name string is put into the message. This message is then sent to DU message handler 34 (step 9), which then passes it to communications link controller 36 and on to service unit 12 via SU message handler 38 and server manager 40 (FIG. 2). Server manager 40 sends the message to the appropriate server for processing.

When a reply message is returned to DU message handler 34 from service unit subsystem 12, the message is passed to server handler 152 (step 10). Server handler 152 parses the reply message and places the parameters into an output parameter table 154 (step 11). The order in which the parameter are placed in output parameter table 154 may be important to determine the correct display format. Server handler 152 also validates the return code in user data 130 (FIG. 5) and issues the error message (string) contained in the return code parameters field in the reply message. An output handler 156 then obtains the information that is to be displayed to the craft from output parameter table 154 (step 13).

Output Handler

A number of output tables 158 may be used to control and format the display (step 13). Output table 158 may include a display control table that determines the output lines to be displayed based on the command code and entity type; a line control table that provides the static and dynamic information to be displayed; a parameter control table that describes how each returned dynamic information is to be displayed; and a display text table that provides a conversion from one form of dynamic information to another form of information for display purposes. The display control table provides an index into the line control table (LCT) based on the command code and entity type. A portion of an exemplary display control table for the "DISPLAY SBB DEVICE" command is shown in TABLE F:

TABLE F

Display Control Table

| Command Code | EID Type | Line Control Table Index |
|---|---|---|
| DISPLAY SBB DEVICE | BCM | 2 |
| | CDS | |
| | ECHO | |
| | ... | |
| | STGS | |

When the response contains dynamic information, the line control table provides one or more header lines and one or more parameter lines that are to be displayed. The line control table entries may point to or refer to a header line table (HLT) which contains the header lines and the parameter control table (PCT) for the parameter display lines. A line control table example is shown in TABLE G:

TABLE G

Line Control Table

| LCT Index | Line Type | HLT/PCT Index |
|---|---|---|
| 1 | Header Line | HLT Index — 1 |
|   | Header Line | HLT Index — 2 |
|   | Header Line | HLT Index — 3 |
|   | Parameter Line | PCT Index — 1 |
|   | End Flag | |

The parameter control table provides indices into the output parameter table or input parameter table that contains the parameter value to be displayed. Furthermore, a display column may be specified in the parameter control table for each parameter to be displayed. The parameter control table may further reference a specific display text table (DTT) which allows integer parameters to be converted to specific text strings so that they may be displayed. An exemplary portion of a parameter control table is shown as TABLE H:

TABLE H (Parameter Control Table)

| PCT Index | Display Parameter Type | Parameter Type Index | Display Column | DTT Pointer |
|---|---|---|---|---|
| 1 | CPT String | CPT EID Type Index-1 | 10 | NA |
|   | OPT Integer | OPT Unit ID Index-3 | 20 | NA |
|   | OPT Integer | OPT Entity ID Index-5 | 30 | NA |
|   | OPT Text | OPT Side Index-4 | 40 | Pointer to DTT Side Table |
|   | OPT String | OPT State Index-8 | 50 | NA |
|   | End Flag | | | |

The integer parameters contained in the response may be used as indices into the display text tables to the proper table entry.

Using these output tables, output handler 156 performs conversions when needed and displays a response containing the response parameters and an indication of execution success or failure. The formatted response is then supplied to command interpreter 30 (step 14), which then sends the response to the craft terminal (step 15).

Below are two examples of craft input and screen displays. The first corresponds to the example used in the input handler section. The second illustrates the use of output tables. The examples further illustrate the operations of the invention.

EXAMPLE 1
RESTORE SBB FACILITY
ENTITY TYPE: ~/
   Enter the ENTITY TYPE of the facility
   [DS1, DS3, EXTSYN, OC3, STS1]
   :~DS3
UNIT NUMBER: ~/
   Enter the UNIT ID of the facility
   [0–59]
   :~2

ENTITY NUMBER
   Enter the ENTITY ID to be accessed.
   [1–3]
   :~1
COMMAND SUCCESSFULLY COMPLETED

EXAMPLE 2
DISPLAY SBB DEVICE
ENTITY TYPE: ~/
   Enter the ENTITY TYPE of the device
   [BCM, CDS, ECHO, HLTP, MTXI, OTM, STGS, STSM, RESM]
   :~BCM
UNIT TYPE: ~/
   Enter the UNIT TYPE of the device
   [OC3*DU, RES*DU]
   :~OC3
UNIT NUMBER: ~/
   Enter the UNIT ID of the device
   [0–59]
   :~0
SIDE: ~/
   Enter the SIDE of the device
   [A, B]
   :~A

| ENTITY TYPE | UNIT ID | SIDE | STATE |
|---|---|---|---|
| BCM | 2 | A | OOS-MA UAS |

COMMAND SUCCESSFULLY COMPLETED

It may be seen from the above example that craft entries may be preceded by a special character, such as "~". Further, the craft may respond with a "~/" to allow the system to provide a more verbose prompt along with a list of possible choices for the response. Responses to the command and parameters end with a text string "COMMAND SUCCESSFULLY COMPLETED" to indicate the end of the command and the status of the execution of the command.

Constructed and operating in this manner, any changes or additions to the command keywords, required parameters for the commands, formats, etc. would require only that appropriate changes be made in the tables. No additional coding or code modification and its associated debugging is necessary. Furthermore, a single table-driven interface system is used to interface with multiple servers. Because the table-driven interface system is divided into three main functions: input handler and its associated tables, server handler, and output handler and its associated tables, changes to any specific function do not affect the other functions. Further, changes to each function would only require changes to the tables associated with the specific function.

Security and authentication may not be required prior to craft communications with service unit subsystem 12. Typically, the craft personnel is required to perform a log-in function or the like in order to gain access into the system. Therefore, once a log-in has been performed, the table-driven interface system may be treated as a trusted client and no further authentications are needed.

Although several embodiments of the present invention and its advantages have been described in detail, it should be understood that mutations, changes, substitutions, transformations, modifications, variations, and alterations can be made therein without departing from the teachings of the present invention, the spirit and scope of the invention being set forth by the appended claims.

What is claimed is:

1. A table-driven interface system to a computer application, comprising:
   an input handler operable to receive a command entered by a user;
   at least one input table indexable by the command for determining at least one required input parameter associated with the command, the at least one required input parameter being used to prompt the user for at least one required input parameter value;
   at least one input parameter table operable to contain the at least one required input parameter value entered by the user; and
   a server handler operable to construct a message having a predetermined format containing the at least one required input parameter value contained in the at least one input parameter table, the server handler further operable to send the constructed message to a server, the server operable to provide a reply message to the server handler without the necessity of code modification within the server, the reply message containing at least one output parameter value to be displayed to the user.

2. The table-driven interface system, as set forth in claim 1, further comprising:
   at least one output parameter table operable to contain the at least one output parameter value of the reply message received by the server handler;
   at least one output table containing display control information indexable by the command and the at least one required input parameter; and
   an output handler operable to construct a formatted display of the at least one output parameter value with the display control information contained in the at least one output table, the formatted display being displayed to the user.

3. The table-driven interface system, as set forth in claim 1, wherein the input table comprises:
   a command code table indexable by the command for determining an input sequence index into an input sequence table; and
   the input sequence table indexable by the input sequence index for determining a sequence of at least one required input parameter associated with the command.

4. The table-driven interface system, as set forth in claim 3, wherein the at least one input table further comprises an entity table indexable by the at least one required input parameter for determining parameters associated with particular entities in the system.

5. The table-driven interface system, as set forth in claim 3, wherein the sequence of at least one required input parameter includes an entity, and the input table further comprises an entity table indexable by the entity identifying at least one entity type, the at least one entity type being displayed to the user to prompt the user for a selection of at least one entity type and parameters associated therewith.

6. The table-driven interface system, as set forth in claim 1, wherein the at least one output table comprises a display control table indexable by the command and the at least one parameter value for determining output lines to be displayed.

7. The table-driven interface system, as set forth in claim 6, wherein the display control table includes a line control table index, and the output table comprises a line control table indexable by the line control table index for determining the number and type of lines to be displayed.

8. The table-driven interface system, as set forth in claim 7, wherein the line control table index includes a parameter control table index associated with a parameter type line to be displayed, and the output table comprises a parameter control table indexable by the parameter control table index for identifying the parameter value contained in the input parameter table or output parameter table to be displayed.

9. The table-driven interface system, as set forth in claim 7, wherein the line control table index includes a header line table index associated with a header type line to be displayed, and the output table comprises a header line table indexable by the header line table index for identifying the header lines to be displayed.

10. The table-driven interface system, as set forth in claim 1, further comprising:
    a command interpreter operable to receive the command from the user and passing the command to the input handler; and
    a parameter validation file operable to determine an appropriate prompt in response to the at least one required input parameter.

11. A table-driven interface system to a computer application, comprising:
    an input handler operable to receive a command entered by a user;
    at least one input table indexable by the received command for determining a sequence of required input parameters associated with the received command, the sequence of required input parameters being used to prompt the user for required input parameter values;
    a server handler operable to construct a message having a predetermined format containing the required input parameter values, the server handler further operable to send the constructed message to a server, the server operable to provide a reply message to the server handler without the necessity of code modification within the server, the reply message containing at least one output parameter value;
    at least one output table containing display control information based on the received command and required input parameters; and
    an output handler operable to construct a formatted display of the at least one output parameter value with the display control information contained in the at least one output table, the formatted display being displayed to the user.

12. The table-driven interface system, as set forth in claim 11, wherein the at least one input table comprises an input parameter table operable to contain the at least one required input parameter value entered by the user.

13. The table-driven interface system, as set forth in claim 11, wherein the at least one output table comprises an output parameter table operable to contain the at least one output parameter value of the reply message received by the server handler.

14. The table-driven interface system, as set forth in claim 11, wherein the at least one input table comprises:
    a command code table indexable by the received command for determining an input sequence index into an input sequence table; and
    the input sequence table indexable by the input sequence index for determining a sequence of at least one required input parameter associated with the received command.

15. The table-driven interface system, as set forth in claim 14, wherein the at least one input table further comprises an entity table indexable by the at least one required input parameter for determining parameters associated with particular entities in the system.

16. The table-driven interface system, as set forth in claim 14, wherein the sequence of at least one required input parameter includes an entity, and the input table further comprises an entity table indexable by the entity for identifying at least one entity type, the entity type being displayed to the user to prompt the user for a selection of at least one entity type and parameters associated with the entity type.

17. The table-driven interface system, as set forth in claim 11, wherein the at least one output table comprises a display control table indexable by the received command and the at least one parameter value for determining output lines to be displayed.

18. The table-driven interface system, as set forth in claim 17, wherein the display control table includes a line control table index, and the output table comprises a line control table indexable by the line control table index for determining the number and type of lines to be displayed.

19. The table-driven interface system, as set forth in claim 18, wherein the line control table index includes a parameter control table index associated with a parameter type line to be displayed, and the output table comprises a parameter control table indexable by the parameter control table index for identifying the parameter value contained in the input parameter table or output parameter table to be displayed.

20. The table-driven interface system, as set forth in claim 18, wherein the line control table index includes a header line table index associated with a header type line to be displayed, and the output table comprises a header line table indexable by the header line table index for identifying the header lines to be displayed.

21. The table-driven interface system, as set forth in claim 11, further comprising:
 a command interpreter operable to receive the commands from the user and passing the commands to the input handler; and
 a parameter validation file operable to determine an appropriate prompt in response to the at least one required input parameter.

22. A table-driven method to interface to a computer application, comprising:
 receiving a command entered by a user;
 indexing into at least one input table by the received command and determining at least one required input parameter associated with the received command;
 prompting the user to enter a value for the at least one required input parameter;
 putting the user-entered value for the at least one required input parameter in an input parameter table;
 constructing a message having a predetermined format containing the at least one required input parameter value contained in the input parameter table; and
 sending the constructed message to a destination.

23. The table-driven interface method, as set forth in claim 22, further comprising receiving a reply message from the destination, the reply message containing at least one output parameter value to be displayed to the user.

24. The table-driven interface method, as set forth in claim 23, further comprising:
 putting the at least one output parameter value into an output parameter table;
 indexing into at least one output table containing display control information by the received command and the at least one required input parameter; and
 constructing a formatted display of the at least one output parameter value with the display control information contained in the output table; and
 displaying to the user the formatted display.

25. The table-driven interface method, as set forth in claim 22, wherein indexing into the at least one input table comprises:
 indexing into a command code table by the received command and determining an input sequence index into an input sequence table; and
 indexing into the input sequence table by the input sequence index and determining a sequence of at least one required input parameter associated with the received command.

26. The table-driven interface method, as set forth in claim 25, wherein indexing into the at least one input table further comprises indexing into an entity table by the at least one required input parameter, and determining parameters associated with particular entities in the system.

27. The table-driven interface method, as set forth in claim 25, wherein indexing into the at least one input table further comprises:
 indexing into an entity table by an entity, the entity being a required input parameter;
 identifying at least one entity type;
 displaying the identified entity type to the user as a prompt for a selection of at least one entity type and parameters associated with the entity type.

28. The table-driven interface method, as set forth in claim 22, wherein indexing into the at least one output table comprises indexing into a display control table by the received command and the at least one parameter value, and determining output lines to be displayed.

29. The table-driven interface method, as set forth in claim 28, wherein indexing into the at least one output table comprises indexing into a line control table by the line control table index contained in the display control table, and determining the number and type of lines to be displayed.

30. The table-driven interface method, as set forth in claim 29, wherein indexing into the at least one output table comprises indexing into a parameter control table by a parameter control table index contained in the line control table, and identifying the parameter value contained in the input parameter table or output parameter table to be displayed.

31. The table-driven interface method, as set forth in claim 29, wherein indexing into the at least one output table comprises indexing into a header line table by a header line table index contained in the line control table, and identifying the header lines to be displayed.

32. The table-driven interface method, as set forth in claim 22, further comprising using a parameter validation file to determine an appropriate prompt in response to the at least one required input parameter.

33. The table-driven interface method, as set forth in claim 22, further comprising using a command interpreter to receive the commands from the user and passing the commands to the input handler.

* * * * *